(12) United States Patent
Getter et al.

(10) Patent No.: US 11,192,447 B2
(45) Date of Patent: Dec. 7, 2021

(54) VOLUME TANK

(71) Applicant: WORTHINGTON INDUSTRIES, INC., Columbus, OH (US)

(72) Inventors: James M. Getter, Sunbury, OH (US); Kassandra M. Williams, Dublin, OH (US); Xiaoting Liang, Plain City, OH (US)

(73) Assignee: WORTHINGTON INDUSTRIES, INC., Columbus, OH (US)

( * ) Notice: Subject to any disclaimer, the term of this patent is extended or adjusted under 35 U.S.C. 154(b) by 204 days.

(21) Appl. No.: 16/144,464

(22) Filed: Sep. 27, 2018

(65) Prior Publication Data

US 2019/0105985 A1 Apr. 11, 2019

Related U.S. Application Data

(60) Provisional application No. 62/570,243, filed on Oct. 10, 2017.

(51) Int. Cl.
*B60K 15/07* (2006.01)
*B60K 15/03* (2006.01)
*B60K 15/063* (2006.01)

(52) U.S. Cl.
CPC ........ *B60K 15/07* (2013.01); *B60K 15/03006* (2013.01); *B60K 2015/0346* (2013.01); *B60K 2015/0634* (2013.01); *B60K 2015/0638* (2013.01); *B60Y 2200/14* (2013.01); *B60Y 2200/143* (2013.01)

(58) Field of Classification Search
CPC .... B60K 13/03006; B60K 2015/03032; B60K 2015/03164; B60K 2015/03184; B60K 2015/0634; B60K 2015/0638; B60K 15/067; B60K 15/073; B60K 15/07; B60K 2015/03309; B60K 2015/03315; B60K 15/03006; F17C 2201/0123; F17C 2201/0109; F17C 2201/0104;
(Continued)

(56) References Cited

U.S. PATENT DOCUMENTS

| | | | |
|---|---|---|---|
| 3,330,439 A * | 7/1967 | Moorman | B60K 15/063 220/86.2 |
| 3,557,708 A * | 1/1971 | Bolte | B61D 3/10 105/3 |

(Continued)

FOREIGN PATENT DOCUMENTS

| | | | | |
|---|---|---|---|---|
| CN | 104648847 | * | 5/2015 | ............... B60P 3/24 |
| DE | 102006021012 A1 | * | 11/2007 | ............ F17C 11/005 |
| DE | 102012008047 A1 | * | 10/2013 | ................ F17C 1/00 |

OTHER PUBLICATIONS

CN104648847 English translation (Year: 2015).*

*Primary Examiner* — Anne Marie M Boehler
(74) *Attorney, Agent, or Firm* — Tucker Ellis LLP; Carlos Garritano

(57) ABSTRACT

A volume tank that houses a material is provided. The volume tank can include a first bulk head, a second bulk head opposite the first bulk head, a non-symmetrical frustoconical shell section, a cylindrical shell section and a transition section in between the non-symmetrical frustoconical shell section and the cylindrical shell section. The volume tank is configured to be coupled to a portion of a frame of a vehicle, and in a non-limiting embodiment, to a school bus.

15 Claims, 13 Drawing Sheets

(58) Field of Classification Search
CPC .......... F17C 2201/0142; F17C 2201/01; F17C 2201/035
USPC ........ 280/830, 834, 838; 220/562; D23/202, D23/204, 205, 206; 429/6, 205
See application file for complete search history.

(56) References Cited

U.S. PATENT DOCUMENTS

| | | | | |
|---|---|---|---|---|
| 3,642,296 | A * | 2/1972 | Froumajou | B60K 15/063 280/834 |
| 4,108,328 | A | 8/1978 | Page | |
| 5,370,418 | A * | 12/1994 | Pugh | B60K 15/03006 180/311 |
| 7,645,114 | B2 * | 1/2010 | Cannon | B60P 3/2295 414/810 |
| 7,829,240 | B2 * | 11/2010 | Young | B60K 15/063 280/834 |
| 8,047,574 | B2 * | 11/2011 | Hofner | B60K 15/03006 280/830 |
| 8,056,928 | B2 * | 11/2011 | Ijaz | B60K 15/013 280/830 |
| 8,500,170 | B2 * | 8/2013 | Pfaff | B62D 35/001 280/837 |
| 8,801,040 | B2 * | 8/2014 | Thomas | B60P 3/221 105/360 |
| D854,060 | S * | 7/2019 | Getter | D15/138 |
| 2005/0161934 | A1 * | 7/2005 | Rife | B60K 15/07 280/831 |
| 2010/0252353 | A1 * | 10/2010 | Tsubokawa | B60K 15/07 180/314 |
| 2016/0325729 | A1 * | 11/2016 | Askerdal | B60L 50/10 |
| 2017/0299769 | A1 * | 10/2017 | Ohmi | G01V 11/002 |
| 2018/0093563 | A1 * | 4/2018 | Matijevich | B60K 15/063 |

* cited by examiner

VOLUME TANK

CLAIM OF PRIORITY

This application claims the benefit of priority to U.S. Provisional Application titled "VOLUME TANK", Application No. 62/570,243, filed Oct. 10, 2017, which application is herein incorporated by reference.

BACKGROUND

Technical Field

Embodiments of the subject matter disclosed herein relate to a volume tank for a vehicle, wherein an engine of the vehicle utilizes an alternative fuel as a fuel source, and in some examples a compressed gas as a fuel source. Some embodiments are directed to a volume tank for a vehicle that utilizes an alternative fuel stored in volume tank as a fuel source, wherein the vehicle can utilize a combustible fuel engine, a battery powered engine, or a combination thereof.

Discussion of Art

It may be desirable to have an alternative fuel system and method that differs from those systems and methods that are currently available.

SUMMARY

In an embodiment, a volume tank that is configured to store a material for delivery to a vehicle is provided that includes the following: a first bulk head; a second bulk head opposite the first bulk head; a first shell section having a first end and a second end opposite thereto, the first end coupled to the first bulk head; a second shell section having a first end and a second end opposite thereto, the first end of the second shell section coupled to the second end of the first shell section and the second end of the second shell section coupled to the second bulk head, wherein the first end of the second shell section is coupled to the second end of the first shell section at a transition section positioned in between the first shell section and the second shell section; the first shell section is a cylindrical shape; and the second shell section is a non-symmetrical frustoconical shape.

These and other objects of this invention will be evident when viewed in light of the drawings, detailed description and appended claims.

BRIEF DESCRIPTION OF THE DRAWINGS

Reference is made to the accompanying drawings in which particular embodiments and further benefits of the provided subject matter are illustrated as described in more detail in the description below.

DETAILED DESCRIPTION

Figure 1:
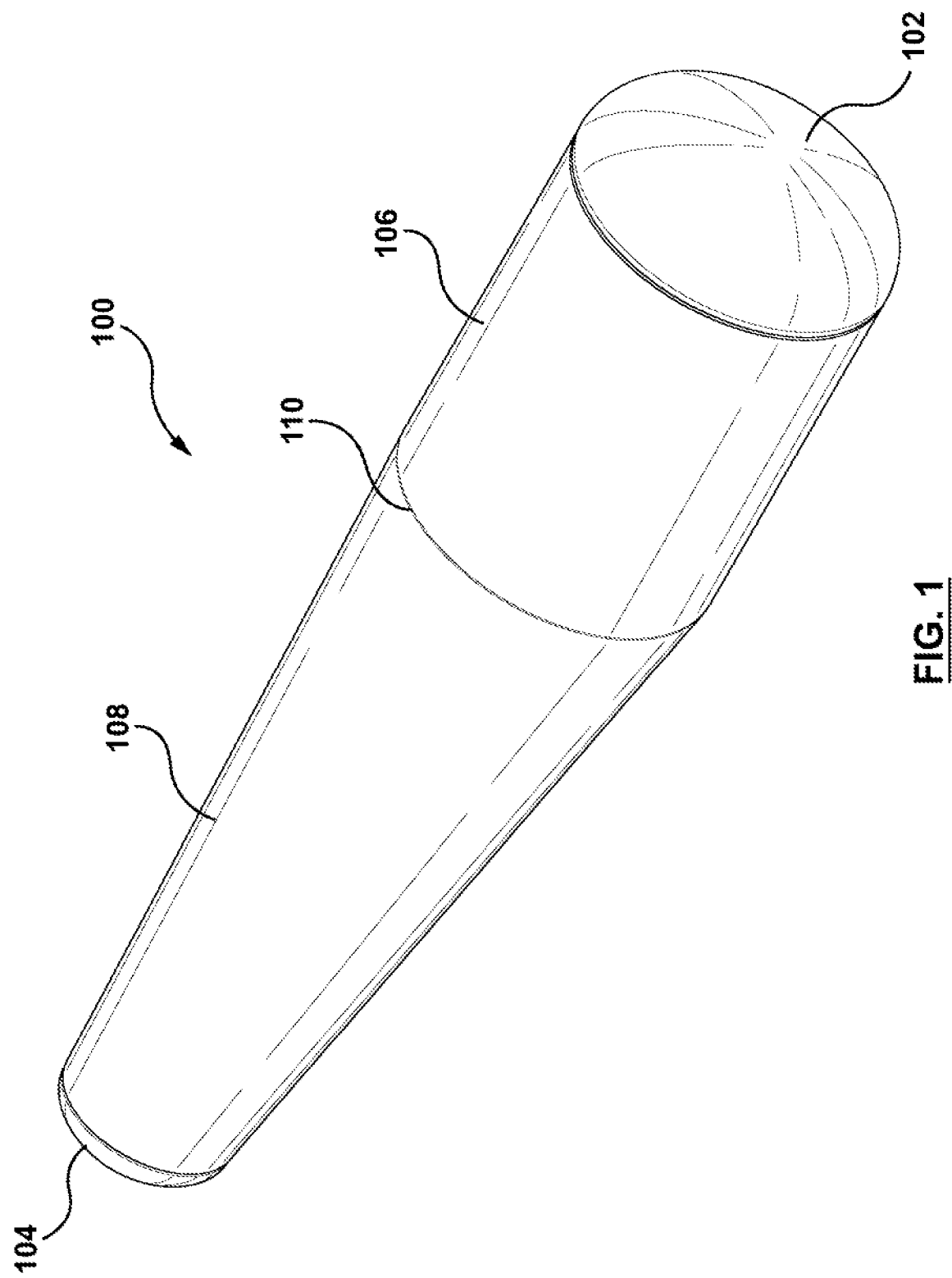
FIG. 1 is a perspective view of a volume tank.

Embodiments of the provided subject matter relate to methods and systems for a volume tank for a vehicle. A volume tank that houses a material is provided. The volume tank can include a first bulk head, a second bulk head opposite the first bulk head, a non-symmetrical frustoconical shell section, a cylindrical shell section and a transition section in between the non-symmetrical frustoconical shell section and the cylindrical shell section. The volume tank is configured to be coupled to a portion of a frame of a vehicle.

The volume tank can house a portion of material and such volume tank can be vertically oriented, horizontally oriented, or in a position in-between horizontal and vertical (in comparison to the ground). Moreover, the volume tank can be mounted to a location on a frame or chassis of the vehicle. By way of example and not limitation, the volume tank can be mounted such that the first bulk head and the second bulk head are coupled to a frame or chassis of a vehicle and are positioned in a plane that is substantially parallel to a ground on which the vehicle is parked or moving. The volume tank can further include electrical and/or mechanical connective means in order to provide electrical and/or mechanical connectivity with the vehicle and/or a computer processing unit (CPU) of the vehicle.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute. The term "vehicle" as used herein may be a mobile machine or a moveable transportation asset that transports at least one of a person, people, or a cargo. For instance, a vehicle can be, but is not limited to being, a bus, a school bus, a commercial bus, a semi, a semi-truck, a semi-trailer truck, a tractor-trailer, a transfer truck, an 18-wheeler, a truck, a class 8 vehicle, an automobile, farm equipment, industrial equipment, construction equipment, van, Sport Utility Vehicle (SUV), a truck that carriers a load and/or freight, a cement truck, a delivery truck, a tractor, a flat-bed truck, and the like. Moreover, a vehicle can be powered by combustible fuel (e.g., unleaded fuel, diesel fuel, compressed natural gas, compressed hydrogen, compressed gas, alternative fuel, among others) or a battery or electric motor. The "volume tank" as used herein can be fabricated from any suitable material that can house or contain at least one of a material such as, but not limited to, a combustible fuel, alternative fuels, renewable fuel sources, nonrenewable fuel sources, liquid fuel sources, or gas fuel sources. In an embodiment, the volume tank can house a material such as, but not limited to, compressed gas, a compressed natural gas, propane or dimethyl ether (DME).

FIGS. 1-7 illustrate a volume tank 100, in accordance with an embodiment. The volume tank 100 can be configured to house or store a material that can be delivered to run an engine for a vehicle. The volume tank 100 can be coupled to, for example, a frame of the vehicle.

The volume tank 100 can include a first bulk head 102 and a second bulk head 104 opposite the first bulk head 102. The volume tank 100 further includes a first shell section 106 and a second shell section 108, wherein the first shell section 106 couples to the second shell section 108 at a transition section 110. The first shell section 106 is further coupled to the first bulk head 102 and the second shell section 108 is coupled to the second bulk head 104. It is to be appreciated that the volume tank 100 can be fabricated as a single tank or fabricated modularly in which various components are welded together. In certain embodiments, the first shell section 106 of the volume tank 100 has at least one surface and the second shell section 108 of the volume tank 100 has at least one surface such that together the first shell section 106 and the second shell section 108 form an even, substantially continuous surface from the first end of the first shell section 106 along a first length to the second end of the second shell section 108 along a second length.

The first shell section 106 can be cylindrical in shape. It is to be appreciated that the first shell section 106 can be, but is not limited to being, a cylindrical shape, a spherical shape, a polygon shape, a square shape, an oval shape, a conical shape, a frustoconical shape, among others. The second shell section 108 can be a non-symmetrical conical shape. It is to be appreciated that the second shell section 108 can be a non-symmetrical conical shape, a non-symmetrical frustonical shape, a symmetrical conical shape, a symmetrical frustoconical shape, a cylindrical shape, a spherical shape, a polygon shape, a square shape, an oval shape, among others. In an embodiment, the first bulk head 102 can include a first diameter and the second bulk head 104 can include a second diameter, wherein the first diameter and the second diameter can have a ratio of 2:1. It is to be appreciated that the first diameter and the second diameter can have a ratio selected by sound engineering judgment without departing from the scope of the subject innovation. In an embodiment, the first bulk head 102 and the second bulk head 104 can be end caps that include exterior ends that are rounded. In another embodiment, the first bulk head 102 can include an ellipse having a first diameter and a second diameter, wherein the first diameter and the second diameter can have a ratio. By way of example, the ratio can be 2:1 but can be selected with sound engineering judgment without departing from the scope of the subject innovation. In another embodiment, the second bulk head 104 can include an ellipse having a first diameter and a second diameter, wherein the first diameter and the second diameter can have a ratio. By way of example, the ratio can be 2:1 but can be selected with sound engineering judgment without departing from the scope of the subject innovation. It is to be appreciated that the ellipse for the first bulk head 102 can be sized and selected without a ratio to the ellipse for the second bulk head 104.

The volume tank 100 can be fabricated from two or more shell sections (e.g., first shell section 106 and second shell section 108). It is to be appreciated that the first shell section 106 can be fabricated from one or more shell sections, wherein the one or more shell sections can create a cylindrical shape for the first shell section 106. It is to be appreciated that the second shell section 108 can be fabricated from one or more shell sections, wherein the one or more shell sections can create a nonsymmetrical conical or frustoconical shape for the second shell section 108.

Figure 3:
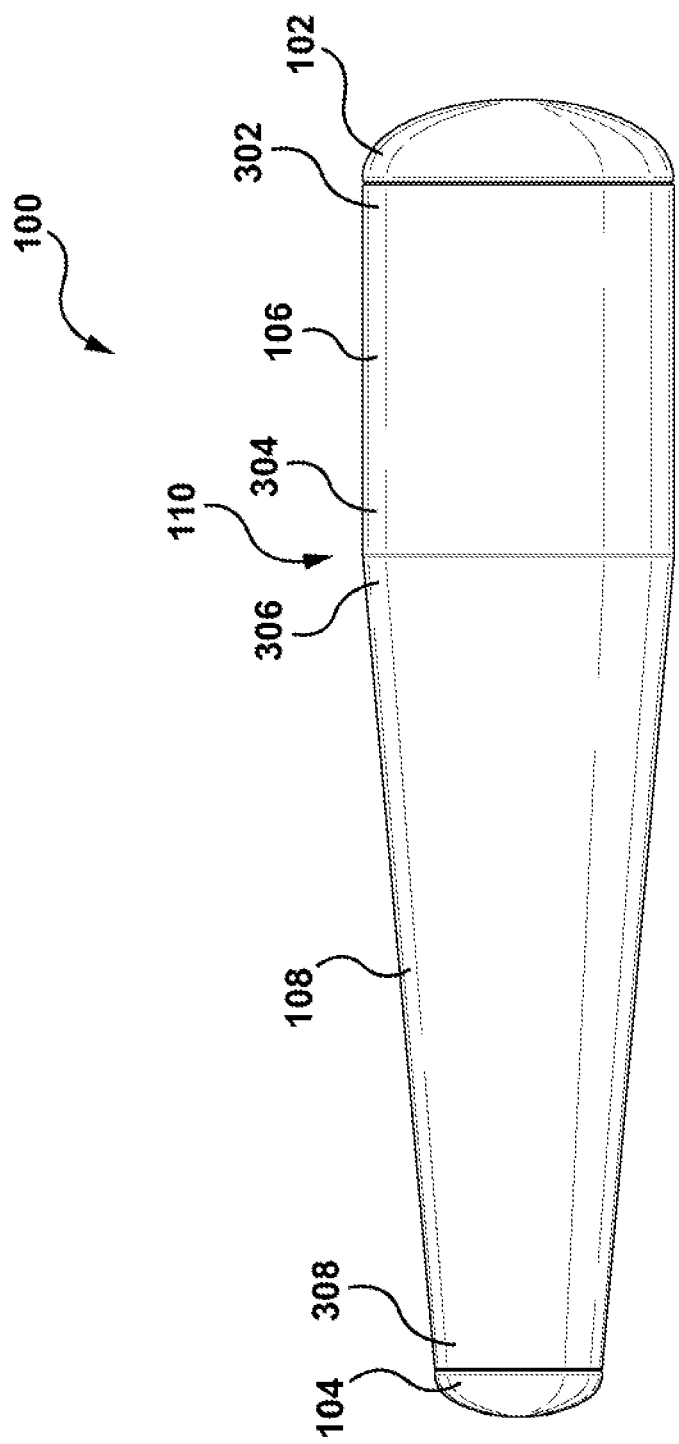
FIG. 3 is a bottom view of the volume tank illustrated in FIG. 1.

Referring to FIG. 3, the first shell section 106 can include a first end 302 and a second end 304 opposite thereto. The second shell section 108 can include a first end 306 and a second end 308 opposite thereto. The first end 302 of the first shell section 106 can be coupled to the first bulk head 102. The second end 304 of the first shell section 106 can be coupled to the first end 306 of the second shell section 108. The second end 308 of the second shell section 108 can be coupled to the second bulk head 104.

In conventional systems, a fuel tank would be cylindrical with a diameter. This conventional fuel tank would not comply with safety regulations in regards to clearance for a rear of a vehicle when mounted between a rear bumper and a rear axle of a vehicle. In particular, the volume tank 100 includes the non-symmetrical conical or frustoconical shape for the second shell section 108 which includes a tapered length to obey clearance laws and safety laws by states or governments.

Figure 4A:
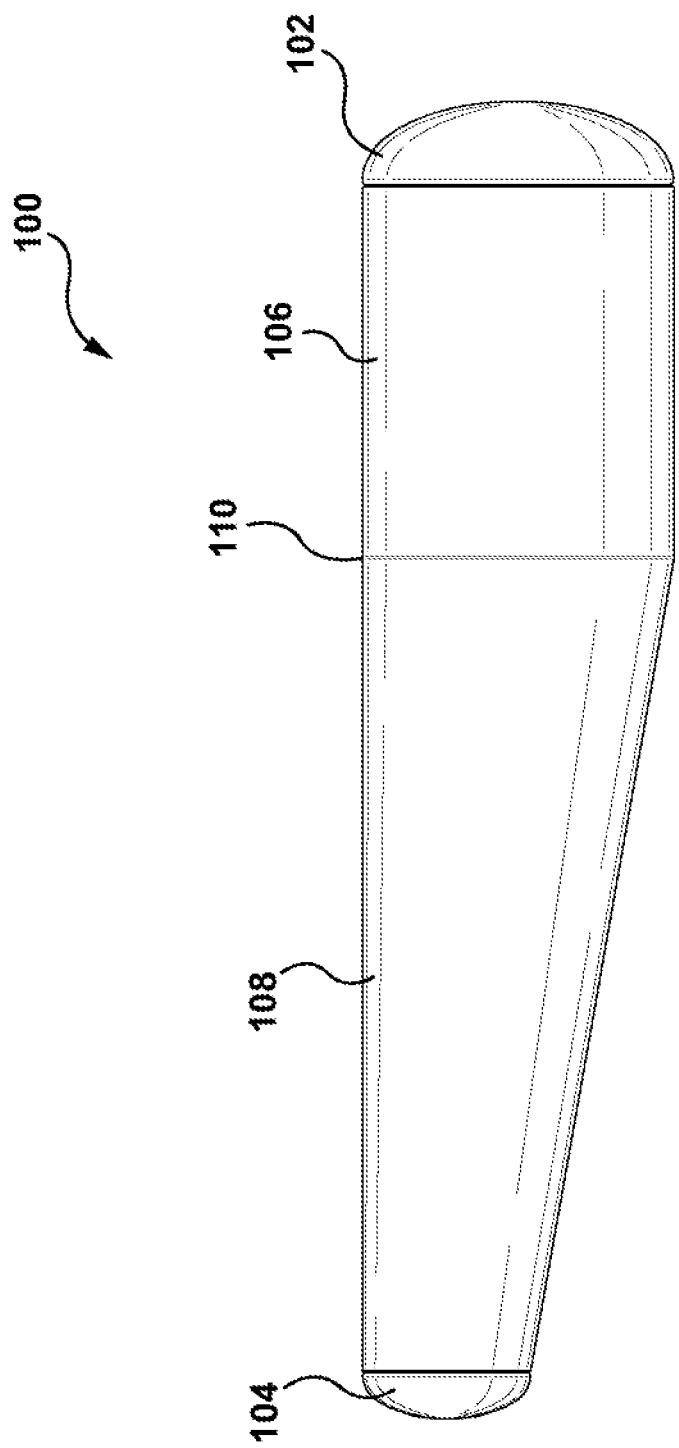
FIG. 4A is a left side view of the volume tank illustrated in FIG. 1.
Figure 4B:
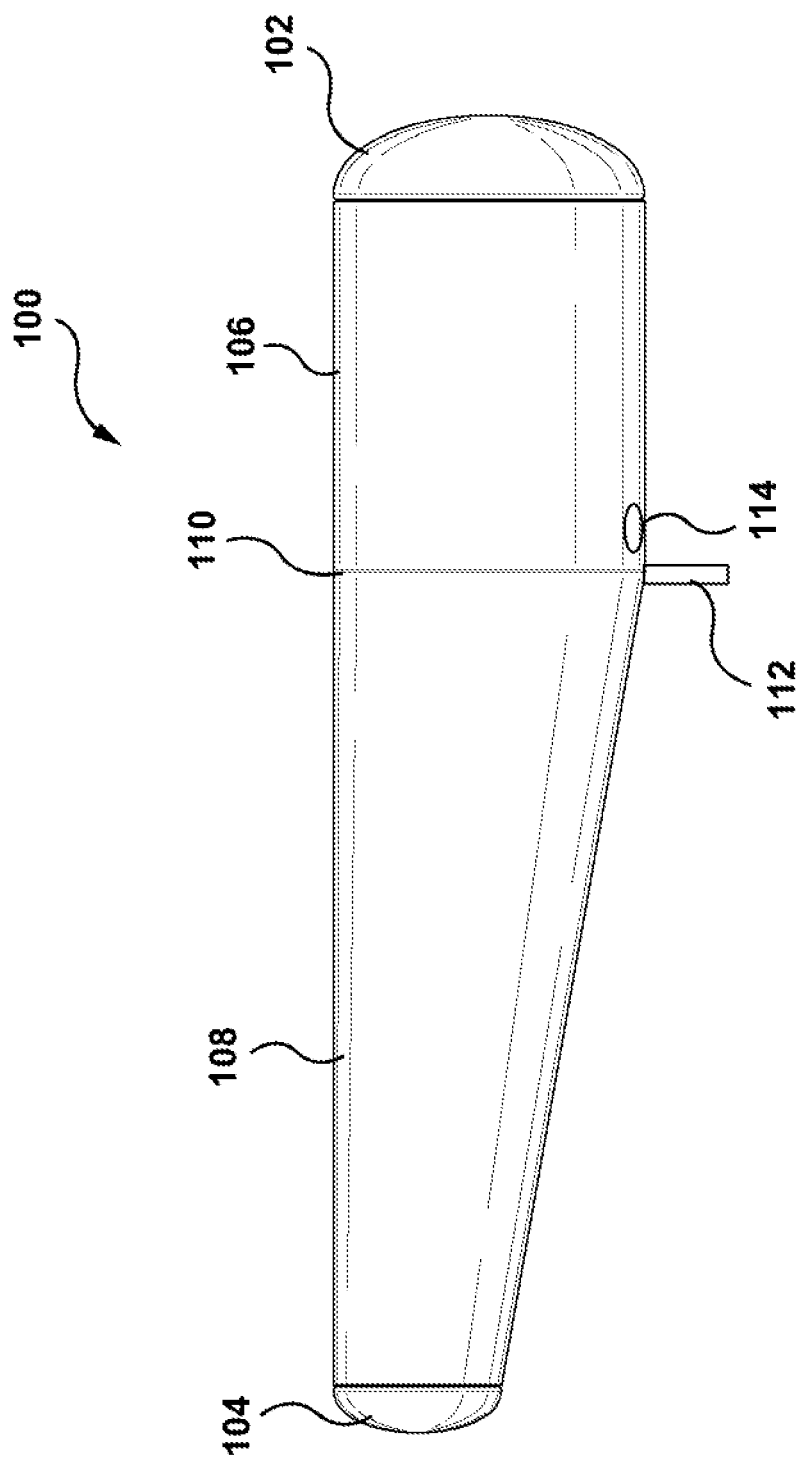
FIG. 4B is a left side view of an embodiment of the volume tank.
Figure 5:
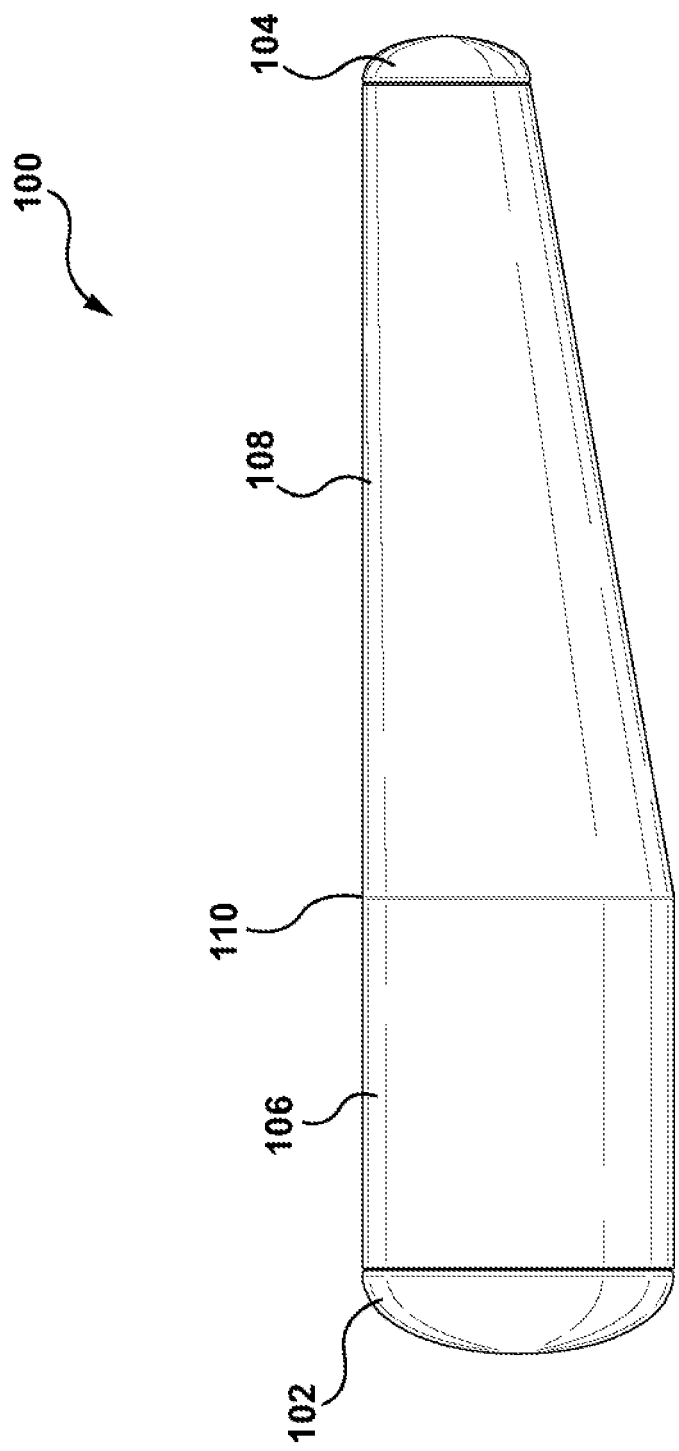
FIG. 5 is a right side view of the volume tank illustrated in FIG. 1.
Figure 6:
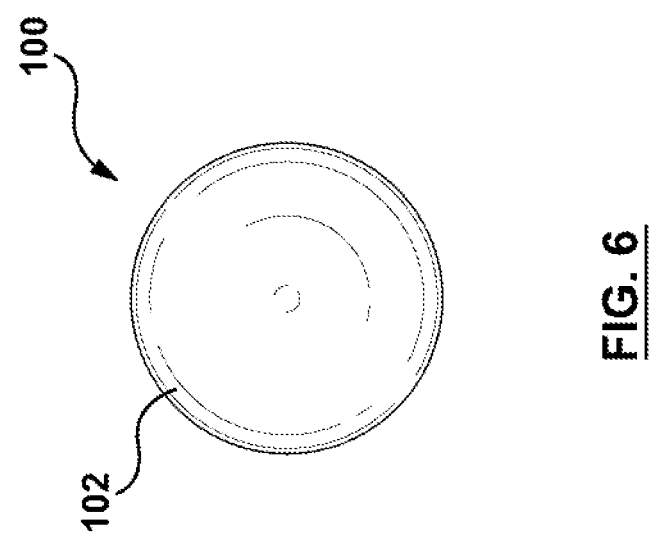
FIG. 6 is a front view of the volume tank illustrated in FIG. 1.
Figure 7:
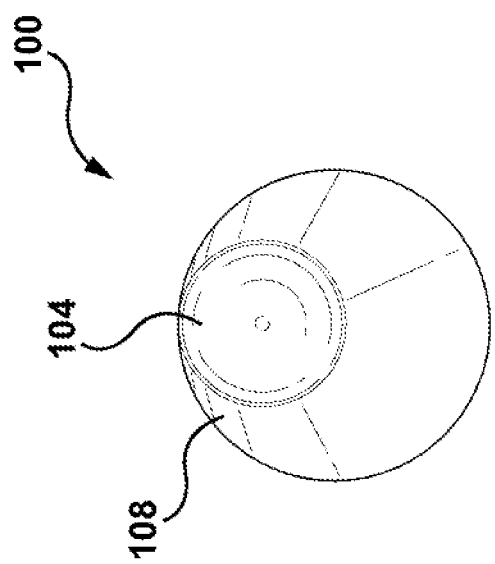
FIG. 7 is a rear view of the volume tank illustrated in FIG. 1.

Turning now to FIG. 4B, the volume tank 100 can include a pickup component 112 that is configured to gather material stored in the volume tank 100 for direct or indirect delivery to an engine of the vehicle. In an example, the pickup component 112 is a pickup assembly that can include a pickup tube, a pickup filter, and/or pickup assembly mounting components. Conventional techniques and systems require two (2) or more pickup components 112 based on the conventional shape of a fuel storage tank so as to mitigate lack of fuel delivery when a vehicle is traveling upgrade or downgrade. However, the volume tank 100 allows the utilization of a single pickup component 112 that can be positioned in a center (in comparison to a driver side and passenger side) on a bottom floor of the volume tank 100 in a position that is proximate the transition section 110 or where the transition section 110 meets the first shell section 106. It is to be appreciated that the pickup component 112 location in the volume tank 100 can be chosen using sound engineering judgment without departing from the scope of the subject innovation.

The volume tank 100 can include an opening 114 that can allow delivery of a stored material to an engine of the vehicle in a direct manner or an indirect manner. For example, the opening 114 can include tubing to directly connect the volume tank 100 to an engine. In another example, the opening 114 can include tubing that indirectly connects the volume tank 100 to an engine in which the tubing delivers material from the volume tank 100 to a pump, filter, valve, etc. between the engine and the volume tank 100. The opening 114 can be configured to receive a valve or fitting that enables filling or dispensing of a portion of material. For instance, the valve can be a two-way valve that allows material to enter the volume tank 100 and also allows the material to exit the volume tank 100. It is to be appreciated that the volume tank 100 can include one or more openings 114.

Further, the volume tank 100 can include one or more sensors to detect a parameter (e.g., temperature, pressure, level within the volume tank, integrity or foreign material, among others) related to a material stored in the volume tank. A notification component can be included with the volume tank 100 that communicates a notification based on a data collection from the one or more sensors. Such notification can be communicated to a cab of the vehicle or a location such as a depot that manages one or more vehicles.

It is to be appreciated that the opening on the volume tank 100 can be configured to receive material that is stored in the volume tank 100 and/or configured to dispense material that is stored in the volume tank 100, wherein the dispensing/receiving is with a component such as a valve, port, and the like.

In another embodiment, the volume tank 100 can include a pressure release device (PRD), wherein the PRD can be configured to release pressure from the volume tank 100 based on a parameter such as a pressure level, a safety event, a computer instruction to release the material from the volume tank 100, a user command, among others. The volume tank 100 can include one or more filters and/or pressure relief devices (PRDs) directly connected to a fill line to the volume tank 100, incorporated into the volume tank 100, a draw line from the volume tank 100, or a combination thereof. For example, a filter can be included in line, after, or within the volume tank 100 or a portion of plumbing or tubing. A PRD is a device adapted to sense one or more physical parameters, such as, without limitation, pressure, temperature, or stress, within or around the volume tank 100 and to vent the contents of the volume tank 100 to the environment (or a containment vessel to store and house such material) if the one or more physical parameters meet a predetermined standard. In one embodiment a PRD may be adapted to sense pressure within the volume tank 100 and to vent the contents of the volume tank 100 to environment (or a containment vessel to store and house such material) if the pressure is more than some predetermined pressure. In some non-limiting embodiments, the predetermined pressure may be 50% of the maximum pressure the volume tank 100 may contain without bursting or otherwise failing.

It is to be appreciated that the volume tank 100 can include one or more valves. Moreover, it is to be appreciated that the volume tank 100 can include one or more chambers within to house one or more materials. For example, a volume tank 100 can be segmented to have a first chamber that houses a first material filled/dispensed with a first valve and a second chamber that houses a second material filled/dispensed with a second valve.

The volume tank 100 can include tubing that delivers the material from the volume tank 100 to a manifold, an engine, or a portion of an engine of the vehicle, wherein the tubing can utilize one or more filters, connectors, valves, regulators, and the like. The volume tank 100 can include tubing or plumbing that delivers the material from the volume tank to at least one of a manifold, an engine, a compartment of the engine, a combustion chamber, or a portion of an engine of the vehicle, wherein the tubing or plumbing can utilize one or more filters, connectors, valves, regulators, sensors, transducers, solenoid valves, and the like. The portion of the engine that receives the material from the volume tank 100 can be, but is not limited to being, a combustion chamber, an intake manifold, or a component that delivers the material to a spark plug for compression and ignition.

In an embodiment, the volume tank 100 can include a fill line in fluid communication with the volume tank 100 on the first bulk head 102, wherein a position of the fill line can be on the first bulk head 102, on a surface of the first bulk head 102, on a top portion of the first bulk head (relative to ground-level), or a portion of the first bulk head 102. The volume tank 100 can further include a draw line in fluid communication with the volume tank 100 on the second bulk head 104, wherein a position of the draw line can be on the second bulk head 104, on a surface of the second bulk head 104, on a top portion of the second bulk head 104 (relative to ground-level), or a portion of the second bulk head 102. It is to be appreciated that the volume tank 100 can include a single line for filling or drawing from the volume tank 100. In another embodiment, the volume tank 100 can include at least one of one or more filters, one or more valves, one or more fill lines, or one or more draw lines.

In another embodiment, the volume tank 100 can include a fill line in fluid communication with the volume tank 100 on second first bulk head 104, wherein a position of the fill line can be on the second bulk head 104, on a surface of the second bulk head 104, on a top portion of the second bulk head 104 (relative to ground-level), or a portion of the second bulk head 104. The volume tank 100 can further include a draw line in fluid communication with the volume tank 100 on the first bulk head 102, wherein a position of the draw line can be on the first bulk head 102, on a surface of the first bulk head 102, on a top portion of the first bulk head 102 (relative to ground-level), or a portion of the first bulk head 102.

In still another embodiment, at least one of a fill line, a draw line, or a combination fill and draw line (e.g., a single line used to fill material into the volume tank 100 and draw material from the volume tank 100 using a two-way valve) can be located on at least one of the first shell section 106 or the second shell section 108. It is to be appreciated that the use of a fill line or draw line or a combination fill and draw line can be chosen with sound engineering judgment without departing from the intended scope of coverage of the embodiments of the subject invention. Additionally, it is to be appreciated that the location and orientation of the draw line, the fill line, or the combination fill and draw line can be chosen with sound engineering judgment without departing from the intended scope of coverage of the embodiments of the subject invention. The fill line can be a dedicated line (e.g., tubing, conduit, and the like) that receives material from outside the volume tank 100 for filling and/or receipt into the volume tank 100. Typically, debris, contaminants, or other particles may enter through a filling process which are harmful or unwanted for a fuel system of a vehicle. Debris, contaminants, or other particles may enter through a filling process and be filtered prior to entry with a filter and/or can settle within the volume tank 100. By way of example and not limitation, the debris, contaminants, or other particles that may enter through the filling process may coat or be within the fill line or settle at a low point or bottom of the volume tank 100. The draw line can be dedicated to deliver the material from the volume tank 100 for use and is not contaminated by the debris or contaminants within the fill line.

Moreover, it is to be appreciated that the volume tank 100 can include one or more fill lines that are dedicated to receive a material for the volume tank 100. In an embodiment, the volume tank 100 can include a first fill line and receptacle on the first location of the volume tank 100 and a second fill line and receptacle on a second location of the volume tank 100. In another embodiment, the volume tank 100 can include a first fill line and receptacle on the first location, a second fill line and receptacle on a second location, and one or more additional fill line and receptacle on a third location.

The fill line can be configured to allow fluid communication between an inlet to receive material for the volume tank and the volume tank 100, wherein the fluid communication is employed by plumbing, tubing, connectors, valves, among others. The draw line can be configured to allow fluid communication between the volume tank 100 and a portion of the engine or the engine, wherein the fluid communication is employed by plumbing, tubing, connectors, valves, among others. The material can exit the volume tank 100 and delivered to the engine for consumption and use. It is to be appreciated that a portion of plumbing can be used to receive material and travel through the fill line to a valve to direct to the volume tank 100 and the material can travel through the valve to the draw line which delivers to the engine or a portion of the engine. In an embodiment, the valve can be, but is not limited to, a one-way valve, a two-way valve, a solenoid valve, a combination thereof, among others.

In another embodiment, a casing can be configured to house and encase one or more volume tanks 100. In particular, the casing can enclose or partially enclose a portion of the volume tank 100 for protection, aerodynamics, aesthetics, safety, or a combination thereof. In an embodiment, the casing can be integrated into a body or paneling of the vehicle to blend thereinto. In another embodiment, the casing can provide protection from debris or other items from impacting or hitting the volume tank 100. For instance, the casing can be shielding to prevent debris or items on a road from impacting the one or more volume tanks 100.

Figure 2:
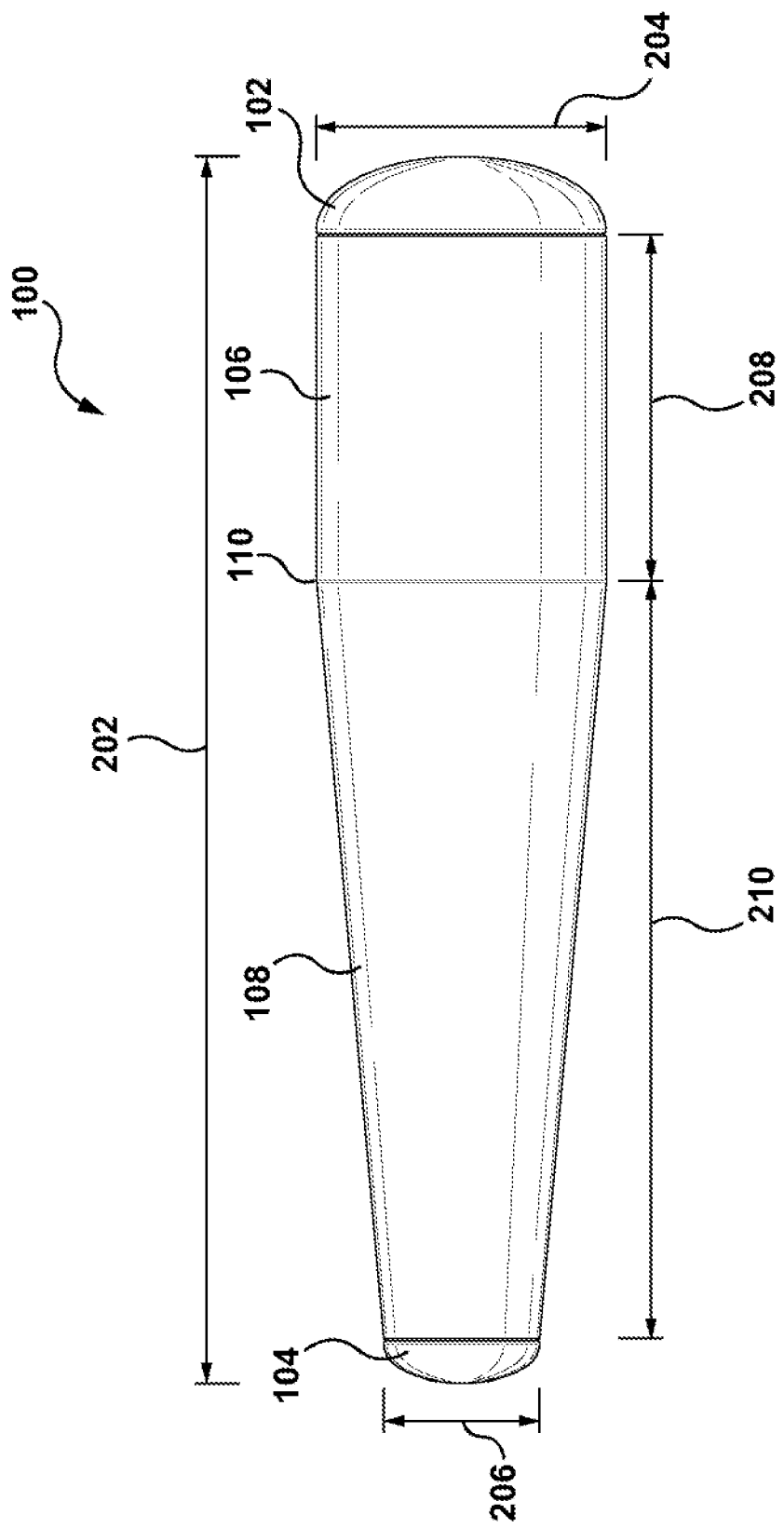
FIG. 2 is a top view of the volume tank illustrated in FIG. 1.

Referring to FIG. 2, the volume tank 100 can have a length 202 from first bulk head 102 to second bulk head 104 and a first diameter 204 for the first bulk head 102, a diameter 206 for the second bulk head 104, a length 208 for the first shell section 106, and a length 210 for a second shell section 108. The volume tank 100 can be fabricated from at least one of a metal, a plastic, a polymer, or a composite material. Yet, it is to be appreciated that the volume tank 100 shape, materials, composition, or size can be chosen with sound engineering judgment without departing from the intended scope of coverage of the embodiments of the subject invention.

By way of example and not limitation, the volume tank 100 can have the following dimension: the length 202 can be approximately 110 inches or in a range of 35 inches to 144 inches; the diameter 204 can be approximately 24 inches or in a range of 14 inches to 30 inches; the diameter 206 can be approximately 12 inches or in a range of 6 inches to 24 inches; the length 208 can be approximately 52 inches or in a range of 15 inches to 90 inches; and the length 210 can be approximately 57 inches or in a range of 15 inches to 90 inches. Yet, it is to be appreciated that the volume tank 100 size and components thereof can be chosen with sound engineering judgment without departing from the intended scope of coverage of the embodiments of the subject invention.

The volume tank 100 can include one or more liners of a material. For instance, the volume tank 100 can include a liner made of a first material. In certain embodiments, the first material is at least one of a plastic, a metal, a steel, a thermoplastic, among others. In certain embodiments, the volume tank 100 can include a wrapping of a second material. In certain embodiments, the second material is at least one of a carbon fiber, a composite material, a Teflon, or a disparate material from the first material.

It is to be appreciated that the volume tank 100 can house a portion of a material, wherein the material can be a solid, a gas, a liquid, a plasma, among others. By way of example and not limitation, the material can be an alternative fuel. In still another example that is not limiting on the subject innovation, the material can be a material at a high pressure in comparison to an atmospheric pressure.

In still another example, the volume tank 100 can be used with a fuel system for a vehicle and can store a material that can be, for instance, a fuel for a vehicle. For example, in addition to compressed natural gas, the volume tank 100 can be utilized with a fuel system that utilizes or consumes renewable fuel sources, nonrenewable fuel sources, liquid fuel sources, or gas fuel sources for a vehicle, wherein the volume tank 100 can store such renewable fuel sources, nonrenewable fuel sources, liquid fuel sources, or gas fuel sources. Renewable fuel sources can include biofuels such as vegetable oil, ethanol, methanol, butanol, other bioalcohols, biomass, or biodiesel, among others. Renewable fuel sources can also include hydrogen and/or hydrogen fuel cells, refuse-derived fuel, chemically stored fuel, non-fossil methane, non-fossil natural gas, ammonia, formic acid, liquid nitrogen, compressed air, dimethyl ether (DME), or propane derived from renewable methods, among others. Nonrenewable fuel source can include gasoline, propane, or diesel, among others. Additional liquid or gas fuel sources can include any mixture or blend of energy sources, for example, E10, E15, E30, or E85 fuel, or HCNG (blend of compressed natural gas with hydrogen). It is be appreciated that the volume tank 100 can house a material chosen with sound engineering judgment without departing from the intended scope of coverage of the embodiments of the subject invention and such material can be used for a fuel system of a vehicle, a machine, a device, or any combination thereof.

Figure 8:
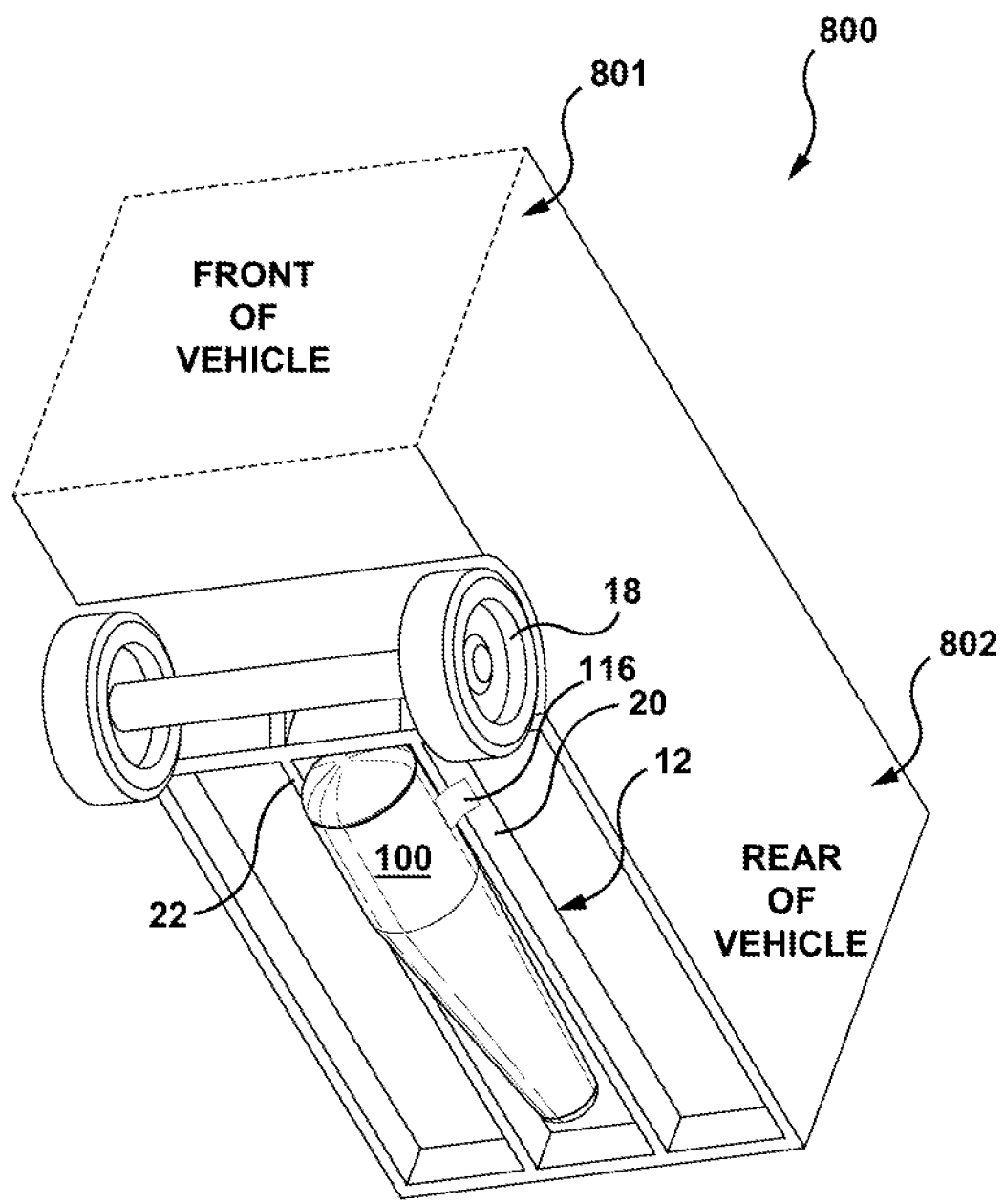
FIG. 8 is a perspective view of a school bus vehicle having a volume tank coupled to thereto.
Figure 9:
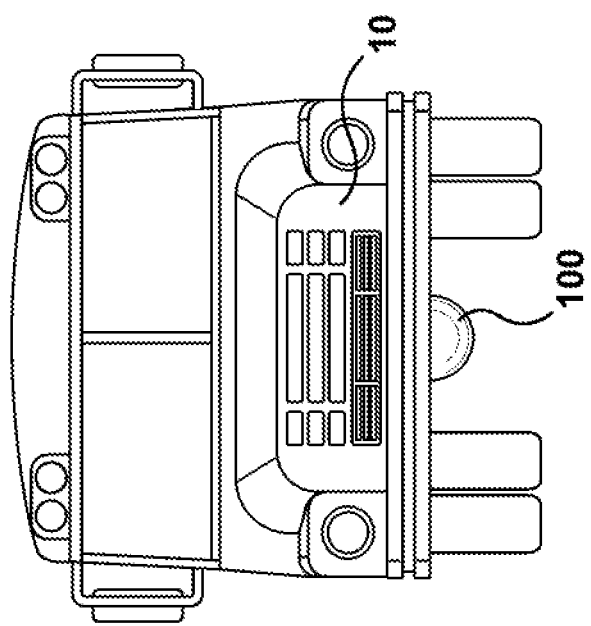
FIG. 9 is a front view of a school bus vehicle having a volume tank coupled to thereto.
Figure 10:
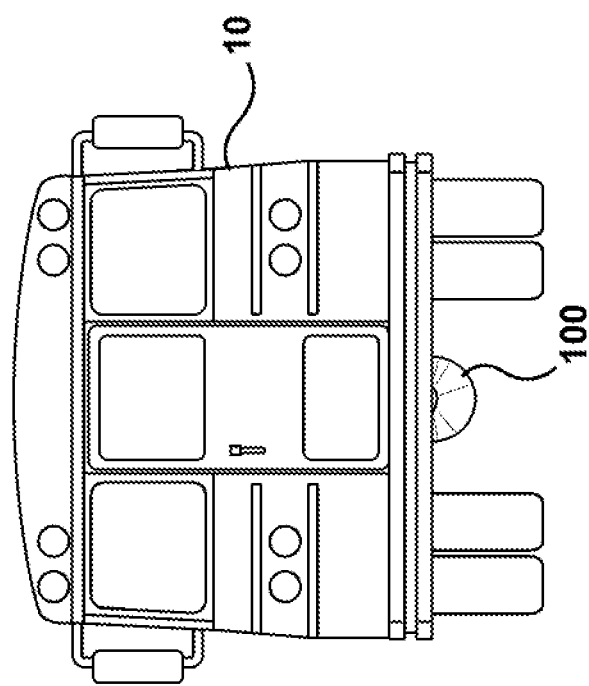
FIG. 10 is a rear view of a school bus vehicle having a volume tank coupled to thereto.
Figure 11:
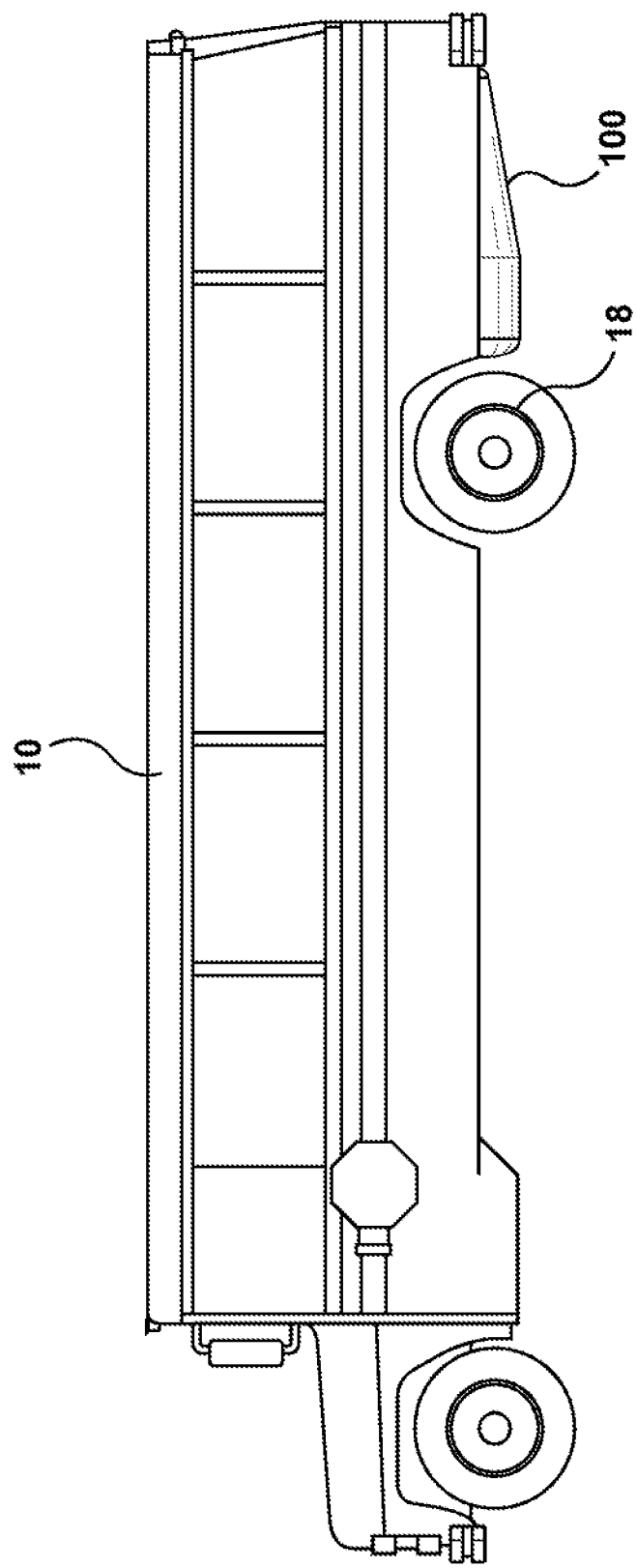
FIG. 11 is a right side view of a school bus vehicle having a volume tank coupled to thereto.
Figure 12:
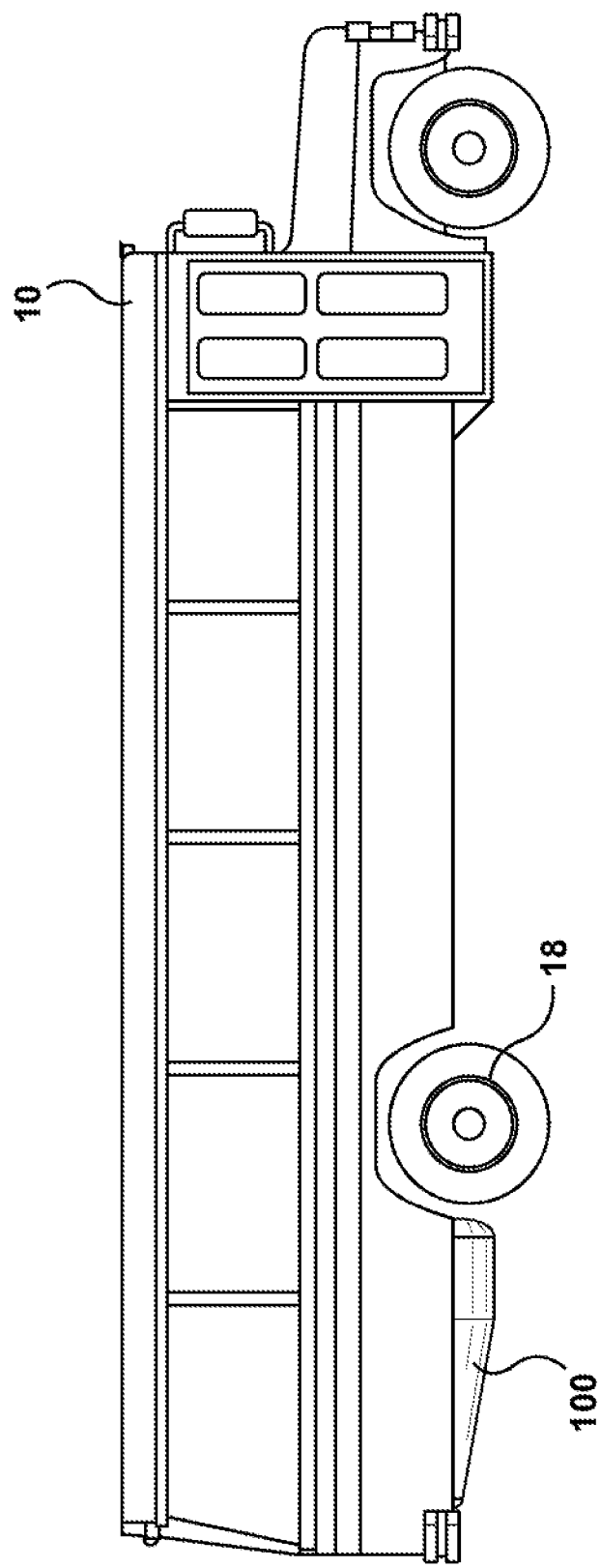
FIG. 12 is a left side view of a school bus vehicle having a volume tank coupled to thereto.

Referring to FIGS. 8-12, a vehicle 10 can include a frame 12 having a cabin and wheel tire/axle assemblies 18 attached therewith. FIG. 8 illustrates a bottom perspective view 800 of a portion of the vehicle 10 having a front of vehicle portion 801 opposite a rear of vehicle 802. It is to be appreciated that the vehicle 10 can utilize one or more volume tanks 100 and one or more volume tanks 100 can be affixed to an underside of the vehicle 10. By way of example and not limitation, the vehicle 10 can be a school bus vehicle or a commercial bus. It is to be appreciated that the volume tank 100 can be coupled to and utilized with a vehicle having a power plant for selectively providing power to drive the vehicle. The power plant can be, for example, an engine in fluid communication with the volume tank 100 for receiving material such as fuel or alternative fuel. In another embodiment, the power plant can be a motor connected with a battery for receiving electricity generated from material stored in the volume tank 100.

The frame 12 can include frame rails 20, 22 which are arranged generally parallel to and spaced apart from one another, and can include optional cross members attached with or to the frame rails 20, 22 to provide structural support for the frame rails 20, 22. The volume tank 100 can be affixed to the frame rails 20, 22 directly or indirectly via one or more supports or members. In an embodiment, one or more brackets 116 can be coupled to the volume tank 100 and the brackets 116 can be coupled to the frame rails 20, 22. In an embodiment, one or more brackets 116 can be coupled to the volume tank 100 and the brackets 116 can be coupled to a member that is coupled to the frame rails 20, 22. In another example, the brackets 116 can be coupled to the frame rails 20, 22 and used to couple to a portion of the volume tank 100. The volume tank 100 can be coupled directly or indirectly to the frame 12 of the vehicle and such coupling can be chosen with sound engineering judgment without departing from the intended scope of coverage of the embodiments of the subject invention.

The volume tank 100 can be positioned on an underside of the vehicle 10. It is to be appreciated that the volume tank 100 although illustrated in a horizontal configuration in comparison to a ground level, the volume tank 100 can be positioned at an angle or vertical in comparison to the ground level. Moreover, the volume tank 100 can be centered between the rear tires of the vehicle 10. Yet, it is to be appreciated that the volume tank 100 can be positioned in a center line between the driver side and passenger side of the vehicle 10, on a driver side, on a passenger side, or a location therebetween. The volume tank 100 can be oriented such that the first bulk head 102 faces towards the front of the vehicle 10 and the second bulk head 104 faces towards the rear of the vehicle 10.

The volume tank 100 can include a housing that encases the volume tank 100. The housing can include one or more access panels.

It should be understood that in other acceptable embodiments the orientation of the volume tank 100 need not be horizontal; the volume tank 100 may be vertical or in some other orientation or position in between a horizontal position and a vertical position (e.g., an angle between 0 and 90 degrees), such as, without limitation, slanted.

In an embodiment, the volume tank 100 can be mounted with one or more straps. In another embodiment, the volume tank 100 can be neck mounted, that is mounted at one or more necks that are situated at the first bulk head 102 and the second bulk head 104. It is to be appreciated that the volume tank 100 can include a neck on at least one bulk head. A neck mount provides for substantially stress free container expansion and/or contraction. A neck mount may comprise a mounting block having an internal geometry adapted to engage with the neck of the volume tank 100 and an external geometry adapted to engage with a block receiver. In particular, a face of the first neck mount can be coupled to the first inner plate and a face of the second neck mount can be coupled to the second inner plate.

It should be understood that the internal geometry of the mounting block can be adapted to accept a wide variety of shapes of a neck including, but not limited to, cylindrical, cuboid, prismatic, polyhedral, or otherwise. It should be understood that the external geometry of the mounting block and the block receiver can be any of a wide variety of shapes including, but not limited to, cylindrical, prismatic, or otherwise. It should be understood that the fit between the neck of the volume tank 100 and the internal geometry of mounting block may be a tight fit or press fit or other fit adapted to prevent slippage between the neck and the internal geometry, or may be a loose or clearance or other fit adapted to permit slippage between the neck and the internal geometry. It is further to be appreciated that a neck mount can be used on each bulk head of the volume tank.

In certain embodiments, the volume tank 100 includes an electrical connector component that provides electrical connectivity to at least one of an electrical component of the vehicle or a CPU of the vehicle. For example, and without limitation, in conventional vehicles, there is typically an electrical system comprising one or more of an alternator or other electrical generator and a battery or other energy storage device adapted to supply electrical energy. Known methods and apparatuses for operationally engaging the electrical system of a vehicle may be adapted for use with the volume tank 100 in order to provide an electrical connector component that may be used to readily couple with the electrical system of vehicle. An electrical connector component coupled with the electrical system of vehicle may be used to supply the volume tank 100 with electrical energy, voltage, current, and the like.

In certain embodiments, the volume tank 100 includes a fuel connector component adapted to fluidly communicate with at least one of a hose of the vehicle or a fuel line of the vehicle, wherein the fuel connector component is adapted to output a portion of the material from the volume tank 100 to a fuel connector component and/or to a supply line or conduit. Such supply line or conduit can deliver the material from the volume tank 100 to the engine or an engine compartment using one or more of a supply line, tubing, or conduit and/or one or more fuel connector components.

The volume tank 100 can include one or more manifolds. In such embodiments, the manifold can include at least one of a fill port that receives a portion of material at a first rate of flow; a fast-fill port adapted to receive a portion of the material to be stored in the volume tank 100 at a second rate of flow, wherein the first rate of flow is lower than the second rate of flow; a fuel transfer port configured for fluid communication of a portion of the material between a container affixed to a second vehicle and the volume tank 100 and also configured for fluid communication of a portion of the material between the volume tank 100 and an external storage container (not integral to the vehicle) such as, without limitation, a storage container at a garage, depot, or other site; and a transfer valve that is configured to control flow for the fuel transfer port. The manifold can further include a shut-off valve, an internal check valve, an inlet fitting, a fuel storage fitting, and a pressure gauge. The manifold can be mounted to the volume tank 100, to the vehicle 10, or to a frame or chassis of the vehicle 10.

The volume tank 100 can include tubing that delivers stored material from the volume tank 100 to the a filter or pressure regulator, from the filter or pressure regulator to an engine, a compartment of the engine, or a portion of an engine of the vehicle, wherein the tubing can utilize one or more filters, connectors, valves, regulators, sensors, transducers, solenoid valves, and the like.

The volume tank 100 can be coupled to a frame or chassis of the vehicle 10 utilizing a shock mount, wherein the shock mount can be, but is not limited to being, a elastomeric damper, a spring-damper, and the like to mitigate movement and stabilize the coupling of the volume tank 100 to the vehicle 10. The shock mount can include a damper with an aperture in which a bolt can be inserted therein, wherein the bolt can attach a bracket assembly to the chassis of the vehicle 10. The shock mount can further include a washer or plate on an end with a nut that facilitates attachment to the chassis.

In an embodiment, a volume tank that is configured to store a material for delivery to a vehicle, is provided that includes the following: a first bulk head; a second bulk head opposite the first bulk head; a first shell section having a first end and a second end opposite thereto, the first end coupled to the first bulk head; a second shell section having a first end and a second end opposite thereto, the first end of the second shell section coupled to the second end of the first shell section and the second end of the second shell section coupled to the second bulk head, wherein the first end of the second shell section is coupled to the second end of the first shell section at a transition section positioned in between the first shell section and the second shell section; the first shell section is a cylindrical shape; and the second shell section is a non-symmetrical conical shape.

In the embodiment, a bracket 116 can be provided that is coupled to a portion of the volume tank, wherein the bracket 116 couples to a portion of a vehicle. In the embodiment, the portion of the vehicle is at least one of a frame of the vehicle or a member coupled to the frame of the vehicle. In the embodiment, the volume tank is positioned on an underside of a vehicle and at a height of at least one of the frame or below the frame. In the embodiment, the volume tank is positioned in between a rear set of tires on the vehicle and in between a bumper and a rear axle of the vehicle. In the embodiment, a pickup component can be provided that is situated inside the volume tank to collect the material for delivery to the vehicle. In the embodiment, an opening can be provided that is configured to fluidly connect the volume tank to an engine of the vehicle directly or indirectly.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the subject matter, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A volume tank that is configured to store a material for delivery to a vehicle, comprising:
   a first bulk head having a first diameter;
   a second bulk head having a second diameter and being opposite the first bulk head;
   a first shell section having a first end having a third diameter, and a second end opposite thereto having a fourth diameter, and a first length from the first end to the second end, the first end coupled to the first bulk head;
   a second shell section having a first end having a fifth diameter, a second end opposite thereto having a sixth diameter, and a second length from the first end of the second shell section to the second end of the second shell section, the second length being greater than the first length, the first end of the second shell section coupled to the second end of the first shell section and the second end of the second shell section coupled to the second bulk head, wherein the first end of the second shell section is coupled to the second end of the first shell section at a transition section positioned in between the first shell section and the second shell section,
   an opening, wherein the opening is configured to fluidly connect the volume tank to an engine of the vehicle directly or indirectly, and
   a pickup component that is situated inside the volume tank proximate the transition section to collect the material for delivery to the vehicle;
   wherein the first diameter is equal to the third, fourth, and fifth diameters, the sixth diameter is less than the fifth diameter, and the sixth diameter is equal to the second diameter,
   wherein the first shell section is a cylindrical shape, and
   wherein the second shell section is a non-symmetrical frustoconical shape.

2. The volume tank of claim 1, further comprising a bracket that is coupled to a portion of the volume tank, wherein the bracket couples to a portion of a vehicle.

3. The volume tank of claim 1,
   wherein a length of the volume tank is between 35 inches and 144 inches;
   wherein the first bulk head has a diameter between 14 inches and 30 inches; and
   wherein the second bulk head has a diameter between 6 inches and 24 inches.

4. The volume tank of claim 1, wherein the first shell has at least one surface and the second shell has at least one surface such that together the first shell and the second shell form an even, substantially continuous surface from the first end of the first shell along a first length to the second end of the second shell along a second length.

5. The volume tank of claim 1, wherein the first bulk head and the second bulk head each comprise a singular end cap with rounded exterior ends.

6. The volume tank of claim 1, wherein the second shell section tapers continuously from the transition section to the second bulk head.

7. The volume tank of claim 1, wherein the first diameter and the second diameter have a ratio of 2:1.

8. The volume tank of claim 1, wherein the opening is positioned on an underside of the volume tank.

9. A vehicle having a power plant for selectively providing power to drive the vehicle, the vehicle comprising:
   a frame;
   a volume tank positioned on an underside of the vehicle and at a height of at least one of the frame or below the frame, the volume tank being configured to store a material for use in providing fuel to the power plant, the volume tank including:
   a first bulk head,
   a second bulk head opposite the first bulk head,
   a first shell section having a first end and a second end opposite thereto, the first end coupled to the first bulk head, and
   a second shell section having a first end and a second end opposite thereto, the first end of the second shell section coupled to the second end of the first shell section and the second end of the second shell section coupled to the second bulk head, wherein the first end of the second shell section is coupled to the second end of the first shell section at a transition section positioned in between the first shell section and the second shell section, wherein the first bulk head and the second bulk head each comprise a singular end cap with a round exterior end, wherein the first shell section is a cylindrical shape, and wherein the second shell section is a non-symmetrical frustoconical shape and tapers continuously from the transition section to the second bulk head to provide clearance at a rear of the vehicle; and a pickup component that is situated inside the volume tank proximate the transition section to collect the material for delivery to the vehicle.

10. The vehicle of claim 9, further comprising a bracket that is coupled to a portion of the volume tank, wherein the bracket couples to at least one of the frame of the vehicle or a member coupled to the frame of the vehicle.

11. The vehicle of claim 9, wherein the volume tank is positioned in between a rear set of tires on the vehicle and in between a bumper and a rear axle of the vehicle.

12. The vehicle of claim 11, wherein the first shell of the volume tank has at least one surface and the second shell of the volume tank has at least one surface such that together the first shell and the second shell form an even, substantially continuous surface from the first end of the first shell along a first length to the second end of the second shell along a second length that is positioned facing an undercarriage of the vehicle.

13. The vehicle of claim 9, further comprising an opening configured to fluidly connect the volume tank to the power plant of the vehicle directly or indirectly.

14. The vehicle of claim 9, wherein the power plant is one of an engine connected with the volume tank for receiving the material as fuel; and a motor connected with a battery for receiving electricity generated from the material stored in the volume tank.

15. A method of providing fuel to a vehicle comprising:

providing a volume tank adapted to be attached to the vehicle and configured to store a material for delivery to the vehicle, the volume tank including:

a first bulk head, a second bulk head opposite the first bulk head, a first shell section having a first end and a second end opposite thereto, the first end coupled to the first bulk head, and a second shell section having a first end and a second end opposite thereto, the first end of the second shell section coupled to the second end of the first shell section and the second end of the second shell section coupled to the second bulk head, wherein the first end of the second shell section is coupled to the second end of the first shell section at a transition section positioned in between the first shell section and the second shell section, wherein the first bulk head and the second bulk head each comprise a singular end cap with a round exterior end, wherein the first shell section is a cylindrical shape, and wherein the second shell section is a non-symmetrical frustoconical shape and tapers continuously from the transition section to the second bulk head to provide clearance at a rear of the vehicle;

attaching the volume tank to an underside of the vehicle between a rear set of tires on the vehicle and in between a bumper and a rear axle of the vehicle so that the tank is configured to provide the material, when stored in the volume tank, to a power plant of the vehicle; and providing a pickup component situated inside the volume tank proximate the transition section to collect the material for delivery to the vehicle.

\* \* \* \* \*